United States Patent
Sakaguchi et al.

(10) Patent No.: US 7,594,071 B2
(45) Date of Patent: *Sep. 22, 2009

(54) STORAGE SYSTEM EMPLOYING A HIERARCHICAL DIRECTORY SECTION AND A CACHE DIRECTORY SECTION

(75) Inventors: Takashi Sakaguchi, Odawara (JP);
Sachiko Hoshino, Odawara (JP);
Yasuyuki Nagasoe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 453 days.

This patent is subject to a terminal disclaimer.

(21) Appl. No.: 11/494,516

(22) Filed: Jul. 28, 2006

(65) Prior Publication Data
US 2006/0265550 A1  Nov. 23, 2006

Related U.S. Application Data

(63) Continuation of application No. 10/849,832, filed on May 21, 2004, now Pat. No. 7,167,950.

(30) Foreign Application Priority Data
Feb. 27, 2004 (JP) ............................. 2004-052962

(51) Int. Cl.
*G06F 12/00* (2006.01)
(52) U.S. Cl. ...................... 711/113; 711/216
(58) Field of Classification Search ................ 711/113, 711/216
See application file for complete search history.

(56) References Cited

U.S. PATENT DOCUMENTS

| 4,464,713 A | 8/1984 | Benhase et al. |
| 4,761,737 A | 8/1988 | Duvall et al. |
| 5,584,005 A | 12/1996 | Miyaoku et al. |
| 6,067,547 A | 5/2000 | Douceur |
| 6,292,795 B1 | 9/2001 | Peters et al. |
| 6,757,794 B2 | 6/2004 | Cabrera et al. |
| 6,839,758 B2 | 1/2005 | Sorensen |
| 6,973,082 B2 | 12/2005 | Devi et al. |
| 2003/0050974 A1 | 3/2003 | Mani-Meitav et al. |
| 2005/0076066 A1 | 4/2005 | Stakutis et al. |
| 2005/0119994 A1 | 6/2005 | Matsunami et al. |

FOREIGN PATENT DOCUMENTS

JP  58-31460  2/1983

*Primary Examiner*—Reginald G Bragdon
*Assistant Examiner*—Aracelis Ruiz
(74) *Attorney, Agent, or Firm*—Brundidge & Stanger, P.C.

(57) ABSTRACT

The present invention carries out cache management in such a manner that the management region required for cache management does not increase, and neither does the performance decline. It is possible to combine use of both a hierarchical directory method and a hash directory method, in order to manage cache data. In a hierarchical directory method, the desired data is retrieved by referring to respective tables T1 to T7, in succession. In a hash directory method, the desired data is reached by referring to a hash table T10 and tables T4 to T7. Access conflicts between the respective methods are avoided by using the EDEV number and a portion of the VDEV number for a hash key. By combining use of both of these methods, it is possible to respond to cases where the storage capacity of the storage system has been increased, without having to raise the management region, and without causing a decline in performance.

12 Claims, 16 Drawing Sheets

Fig. 10

| DIRECTORY METHOD MANAGEMENT TABLE | |
|---|---|
| VDEV# | DIRECTORY METHOD |
| VDEV#0 | HIERARCHICAL DIRECTORY METHOD |
| VDEV#1 | HIERARCHICAL DIRECTORY METHOD |
| VDEV#2 | HIERARCHICAL DIRECTORY METHOD |
| ⋮ | ⋮ |
| VDEV#n | HASH DIRECTORY METHOD |

DIRECTORY METHOD MANAGEMENT TABLE (T11A)

| LU# | DIRECTORY METHOD |
|---|---|
| LU#0 | HIERARCHICAL DIRECTORY METHOD |
| LU#1 | HIERARCHICAL DIRECTORY METHOD |
| LU#2 | HIERARCHICAL DIRECTORY METHOD |
| ⋮ | ⋮ |
| LU#n | HASH DIRECTORY METHOD |

Fig. 12(b)

DIRECTORY METHOD MANAGEMENT TABLE (T11B)

| Port# | DIRECTORY METHOD |
|---|---|
| #0 | HASH DIRECTORY METHOD |
| #1 | HASH DIRECTORY METHOD |
| #2 | HIERARCHICAL DIRECTORY METHOD |
| ⋮ | ⋮ |
| #n | HASH DIRECTORY METHOD |

Fig. 13

| DIRECTORY METHOD MANAGEMENT TABLE ||
|---|---|
| EDEV# | DIRECTORY METHOD |
| EDEV#0 | HIERARCHICAL DIRECTORY METHOD |
| EDEV#1 | HIERARCHICAL DIRECTORY METHOD |
| EDEV#2 | HIERARCHICAL DIRECTORY METHOD |
| ⋮ | ⋮ |
| EDEV#n | HASH DIRECTORY METHOD |

T11C

STORAGE SYSTEM EMPLOYING A HIERARCHICAL DIRECTORY SECTION AND A CACHE DIRECTORY SECTION

This application is a continuation of U.S. patent application Ser. No. 10/849,832, filed May 21, 2004, now U.S. Pat. No. 7,167,950, which is incorporated by reference herein in its entirety.

CROSS-REFERENCE TO RELATED APPLICATIONS

This application relates to and claims priority from Japanese Patent Application No. 2004-52962 filed on Feb. 27, 2004, the entire disclosure of which is incorporated herein by reference.

BACKGROUND OF THE INVENTION

1. Field of the Invention

The present invention relates to a storage system.

2. Description of the Related Art

A storage system provides large-capacity and high-performance storage services to a host computer. In a storage system, for example, a storage region is configured on the basis of a RAID (Redundant Array of Independent Inexpensive Disks), formed by providing a plurality of disk drives in an array configuration. Logical volumes, which are logical storage regions, are formed in the physical storage regions provided by the respective disk drives.

A logical volume is previously associated with a LUN (Logical Unit Number). A host computer issues a write command or a read command of a prescribed format, to the storage system, by identifying a LUN and a block address, or the like. Thereby, the host computer is able to read or write prescribed data from or to the storage system.

A cache memory is used to transmit and receive data between the host computer and the storage system. Data relating to a write request from the host computer (write data) is stored temporarily in the cache memory and then written to a disk drive. Moreover, data relating to a read request from the host computer (read data) is read out via the cache memory and then transmitted to the host computer.

In this way, all of the user data transmitted to and received from the host computer passes through the cache memory. If a request has been made to read out data that is cached in the cache memory, then the data in the cache memory is read out and transmitted to the host computer. If there has been a read out request for data that has not been cached, then the data is read out from the disk drive, and transmitted to the host computer via the cache memory.

In order to read out cached data in response to a request from a host computer, it is necessary to manage data groups which are cached on the cache memory. As a management method of this kind, a hierarchical directory system is known which manages data groups in a plurality of hierarchical levels. Another known management method is a hash directory method using hash tables (Japanese Patent Laid-open No. S58-31460).

The size of the cache memory is related closely to the size of the storage region provided by the disk drives. The greater the storage regions, the larger the amount of cache memory that is required. This is because, unless a cache memory is installed which suits the size of the storage region, cache misses will occur, the cache penalty will increase, and service performance will decline.

Storage systems are used, for example, by various types of organizations, such as businesses, self-governing bodies, and the like, which manage huge volumes of data. The data managed by a business, or the like, increases continuously, year on year, and therefore storage systems are also required to have expandable storage capacity. If the storage capacity of a storage system is increased, then the size of the cache memory installed is also increased.

When the size of the cache memory is increased, the management information required for managing the cache data also increases. In a hierarchical directory system, the cache data is managed by dividing the cache management table into a plurality of levels, and the amount of cache data to be managed increases, as the amount of cache data increases. In a hierarchical directory system, it is possible to manage a large amount of cache data, by either increasing the number of levels managed, or by increasing the table size of each level, without changing the number of levels, or by a combination of these methods.

However, if the number of levels is increased, the number of access operations also increases in accordance with the increase in the number of levels, and hence there is a risk that the performance of the storage system will decline. In a hierarchical directory method, the desired data is retrieved for by referring successively to the management tables of each level. Therefore, the increase in the number of levels leads to an increase in the number of access operations to the tables, and this increase in the number of access operations leads in turn to a decline in the read out speed.

If the table size is increased without increasing the number of levels, then the table size will increase in accordance with the storage region (cache region) that is to be managed by same, and hence the size of the management information will rise, and a large amount of memory will be required in order to store this management information. As described above, since the volume of the cache memory is determined by the storage capacity of the storage system, then ultimately, the management information for managing the cache data will increase in accordance with the storage capacity of the storage system.

The patents referred to above only disclose addressing methods for a memory using hash tables, and they do not include any reference to storage regions providing large-capacity storage services.

SUMMARY OF THE INVENTION

It is an object of the present invention to provide a storage system which makes it possible to prevent increase in the storage region required for storing management information groups, while also preventing decline in the service performance. It is also an object of the present invention to provide a storage system which makes it possible readily to combine use of a hierarchical directory method and a hash directory method. It is also an object of the present invention to provide a storage system which makes it possible to combine the use of both a hierarchical directory method and a hash directory method, by using a common configuration for same, wherever possible. It is also an object of the present invention to provide a storage system which makes it possible to use a hierarchical directory method or a hash directory method, selectively, in a flexible manner. Other objects of the present invention will become apparent from the following description of the embodiments.

BRIEF DESCRIPTION OF THE DRAWINGS

FIG. 10 is an illustrative diagram of a directory method management table relating to a second embodiment;

FIG. 12 is an illustrative diagram of a directory method management table relating to a third embodiment, wherein FIG. 12(*a*) shows a case where the cache management method is set in LU units, and FIG. 12(*b*) shows a case where the cache management method is set in port units;

FIG. 13 is an illustrative diagram showing a directory method management table in a case where the cache management method is set in EDEV number units;

DESCRIPTION OF THE PREFERRED EMBODIMENTS

Figure 1:
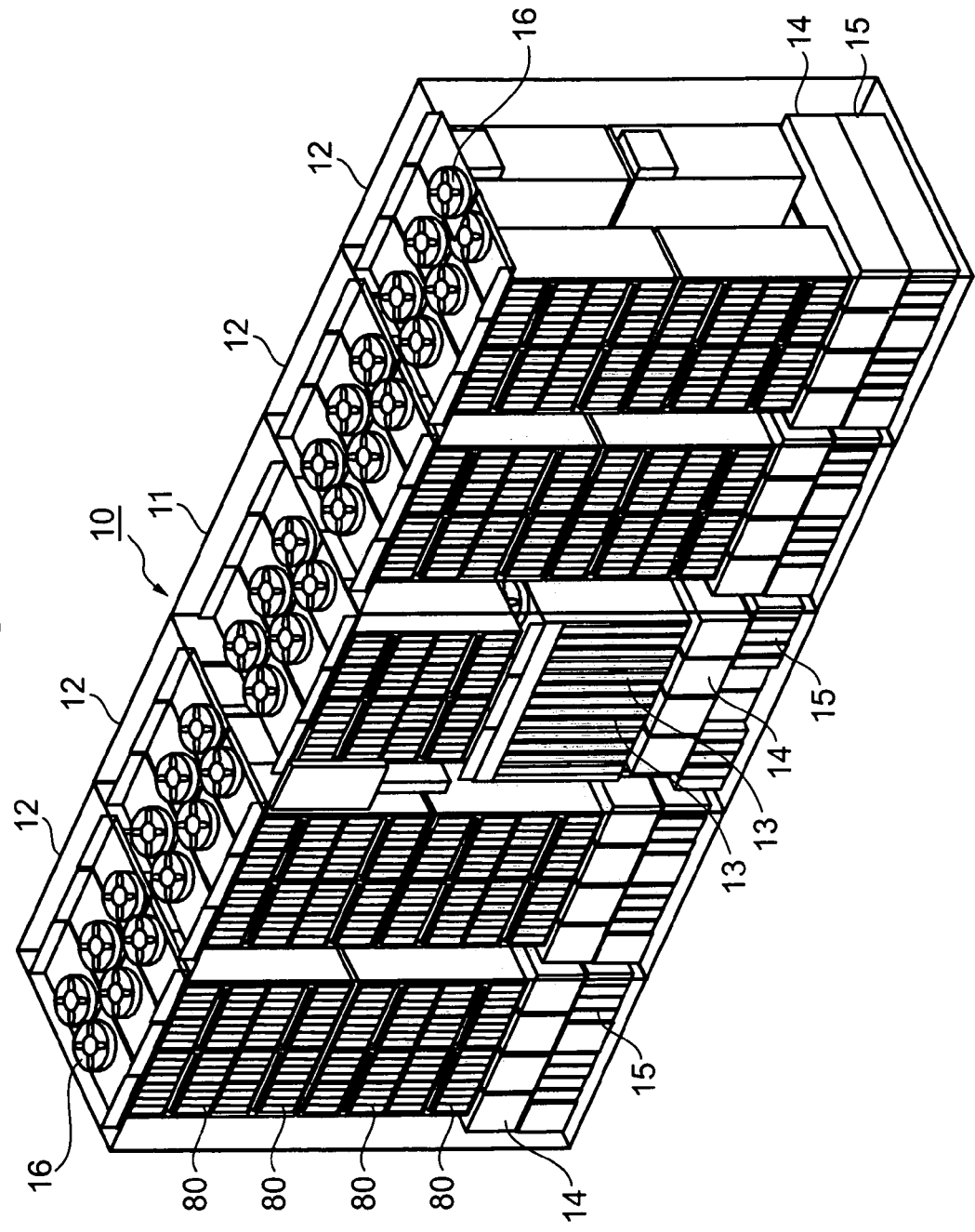
FIG. 1 is a general oblique view showing the external configuration of a storage system according to an embodiment of the present invention.

In order to achieve the aforementioned objects, in the present invention, a management information group for managing cache data is managed by making it possible to combine use of hierarchical directories and hash directories. It is possible to select whether to manage data by means of a hierarchical directory or a hash directory, respectively, in the service units provided by the storage system, for example, (in units of the configuration elements of the storage system). As the provided service units, it is possible to cite as examples each of the respective logical devices configured by the physical devices, each of the respective logical volumes established in the logical devices, or each of the respective ports for accessing the logical devices or logical volumes.

The storage system according to the present invention comprises: a plurality of channel adapters for respectively controlling transmission and reception of data to and from a host device; a plurality of storage device groups for respectively providing logical storage regions; a plurality of disk adapters for respectively controlling transmission and reception of data to and from each of the storage device groups; a cache memory used respectively by each of the channel adapters and each of the disk adapters; and a control memory for storing management information groups for managing the cache memory; the management information groups being managed by combined use of a hierarchical directory and a hash directory.

The host device is, for example, a server, main frame computer, personal computer, or the like. The storage device group is formed on a group of physical storage devices, and provides a logical storage region (a virtual storage region) to the host device. Data to be written from the host device, or data to be read out to the host device, is stored in the cache memory. A management information group for managing the data cached in the cache memory is stored in a control memory. The cache memory and the control memory may be installed as respectively independent memory boards, or a single memory board combining both memories may be used for same. Moreover, it is also possible to use a region of the memory as the cache memory, and to use another region as the control memory.

The management information groups are stored in the control memory. A management information group is information for managing the location, status, and the like, of the data cached in the cache memory, and management information is provided respectively for each element of cache data. The status of the cache data is, for example, a "clean" state indicating a state where the data has been written to a storage device, or a "dirty" state indicating a state where the data has not been written to a storage device, or a "free" state indicating an unused state. The cache data is managed in slot units, for example. Each slot is configured by at least one or more segments. The management information groups are used for retrieving the slot in which the desired cache data is stored, and identifying whether or not that data is usable, or the like.

The management information groups are managed by means of either a hierarchical directory or a hash directory, and it is possible for both a hierarchical directory and a hash directory to coexist. In other words, a portion of the management information groups may be managed by means of a hierarchical directory and the remainder of the management information groups may be managed by means of a hash directory.

Here, if a hierarchical directory is used, then the access speed until the desired management information is reached will be uniform (or approximately uniform), but in order to manage a large number of cache data elements, a large volume of storage resources is required. If a hash directory is used, then a large number of cache data elements can be managed by means of a smaller volume of storage resources, and increases in access speed can also be expected. However, in the case of a hash directory, there is variation in the access speed, and depending on the circumstances, there is a possibility that access may be slower than in the case of a hierarchical directory method.

If a hierarchical directory method alone is used, in order to respond to increase in the capacity of the storage system, the storage region required for managing the management information groups also increases, and this puts pressure on the control memory. On the other hand, if only a hash directory method is used, then it is possible to respond to increased capacity of the storage system, without placing pressure on the storage resources of the control memory. However, in the case of a hash directory method, since the access speed varies depending on circumstances, it is not possible to provide stable quality of service. By enabling combined use of both hierarchical directories and hash directories, it is possible to respond to increases in the capacity of the storage system, without significantly increasing the storage region required for managing the management information groups, and while preventing decline in service performance.

In the case of a hash directory method, a hash table is used. A hash table associates the storage destination pointer for each data element, with respective hash codes. The hash codes are generated by a hash function. The hash function outputs hash codes of fixed length, on the basis of an input hash key.

For the hash key, it is possible to use data originating in the logical block address. The logical block address is address information for identifying data in logical block units, and this information may be distributed over a relatively broad range. Therefore, data originating from the logical block address, for example, a unique slot number determined from the logical block address, is used as a hash key. Thereby, it is possible to reduce hash code conflicts.

If data is accessed in a hierarchical directory, by using the slot number, then it is possible to adopt a configuration whereby the slot number used in a hash directory is different from the slot number used in a hierarchical directory. For example, in a hierarchical directory method, a unique slot number determined from the logical block address is used directly, and in a hash directory method, a portion of the slot number (for example, a prescribed number of significant bits) is combined with other data for expanding the storage region, and this is used as a hash key. Thereby, it is possible to reduce access conflicts between the hash directory and hierarchical directory.

In one aspect of the present invention, the path for accessing a management information group on the basis of a logical block address is divided into an upstream path and a downstream path, the upstream path being constituted by means of a hierarchical directory and a hash directory, and the downstream path being constituted by means of a common hierarchical directory.

More specifically, even if the management information groups are being managed by means of a hash directory method, rather than managing the whole path (retrieval path) for accessing the management information, by means of a hash table, or the like, the upstream side of the access path is managed by a hash directory method, and the downstream side thereof is managed by a hierarchical directory method. The hierarchical directory structure situated on the downstream side of the hash directory may share a hierarchical directory employed in parallel with the hash directory. Therefore, even if a hierarchical directory and a hash directory are used in combination, it is possible to simplify the overall configuration. Moreover, for example, even if the data is managed by means of a hierarchical directory method initially, and then changed to a hash directory method subsequently, or in the contrary case, this change can be made in a relatively simple fashion.

Various types of methods can be adopted for making selective use of a hierarchical directory method and a hash directory method. For example, it is possible to establish the cache management method for each respective group of storage devices, in such a manner that the cache data corresponding to a certain group of storage devices is managed by means of a hierarchical directory, and the cache data corresponding to a further group of storage devices is managed by means of a hash directory.

Moreover, it is also possible to establish a cache management method for each logical volume configured by the group of storage devices, or for each port.

Alternatively, the management information groups corresponding to the data stored in the storage resources within the storage system can be managed by a hierarchical directory method, and the management information groups corresponding to the data stored in storage resources outside of the storage system can be managed by a hash directory method. In the case of an internal company storage system, since the capacity is previously known, it is possible to manage data by means of a hierarchical directory method, provided that the capacity is not significantly large. On the other hand, in the case of an external, third-party storage system, since the capacity is unknown, a hash directory method capable of responding to a large data capacity is used to manage the data.

The present invention may also be understood from the viewpoint of the cache management method used in a storage system, for example. In other words, this cache management method is a cache management method for a storage system comprising: a plurality of channel adapters a plurality of channel adapters for respectively controlling transmission and reception of data to and from a host device; a plurality of storage device groups for respectively providing logical storage regions; a plurality of disk adapters for respectively controlling transmission and reception of data to and from each of the storage device groups; a cache memory used respectively by each of said channel adapters and each of said disk adapters; and a control memory for storing management information groups for managing said cache memory. This cache management method comprises a determining step for determining whether a management information group is to be managed by means of a hierarchical directory or to be managed by means of a hash directory, on the basis of the information on the configuration of the storage system, and a constructing step for constructing a directory for managing the management information groups, in the control memory, in accordance with the management method determined by the determining step.

Below, embodiments of the present invention are described on the basis of FIG. 1 to FIG. 15. The storage system according to the present embodiments comprises: a plurality of channel adapters for respectively controlling transmission and reception of data to and from a host device; a plurality of storage device groups for respectively providing logical storage regions; a plurality of disk adapters for respectively controlling transmission and reception of data to and from each of said storage device groups; a cache memory used respectively by each of said channel adapters and each of said disk adapters; a control memory for storing management information groups for managing said cache memory; a hierarchical directory, constructed in said control memory, for managing a previously determined prescribed range of management information groups; a hash directory, constructed in said control memory, for managing a further previously determined prescribed range of management information groups; and a management method setting section for setting said prescribed range and said further prescribed range. In this storage system, the downstream side of the hash directory is formed by a hierarchical directory of the same structure as the hierarchical directory, and data determined in a unique fashion from the logical block address is used as a hash key for generating a hash code used in said hash directory.

1. First Embodiment

FIG. 1 is a general oblique view showing the external configuration of a storage system 10. The storage system 10 may be configured, for example, by a base frame 11 and a plurality of add-on frames 12. The base frame 11 is the smallest configuration unit of the storage system 10, and it is provided with both storage functions and control functions. The add-on frames 12 are optional items, and are controlled by means of the control functions provided in the base frame 11. For example, it is possible to connect a maximum of four add-on frames 12 to the base frame 11.

The base frame 11 comprises a plurality of control packages 13, a plurality of power supply units 14, a plurality of battery units 15, and a plurality of disk drives 80, provided respectively in a detachable fashion. A plurality of disk drives 80, a plurality of power supply units 14 and a plurality of battery units 15 are provided detachably in the add-on frames 12. Moreover, a plurality of cooling fans 16 are provided respectively in the base frame 11 and the respective add-on frames 12.

The control packages 13 are modules for respectively realizing the channel adapters 20, disk adapters 30 and cache memory 40, and the like, described hereinafter. More specifically, a plurality of channel adapter packages, a plurality of disk adapter packages, and one or more memory package are provided in a detachable fashion in the base frame 11, in such a manner that they can be exchanged in package units.

Figure 2:
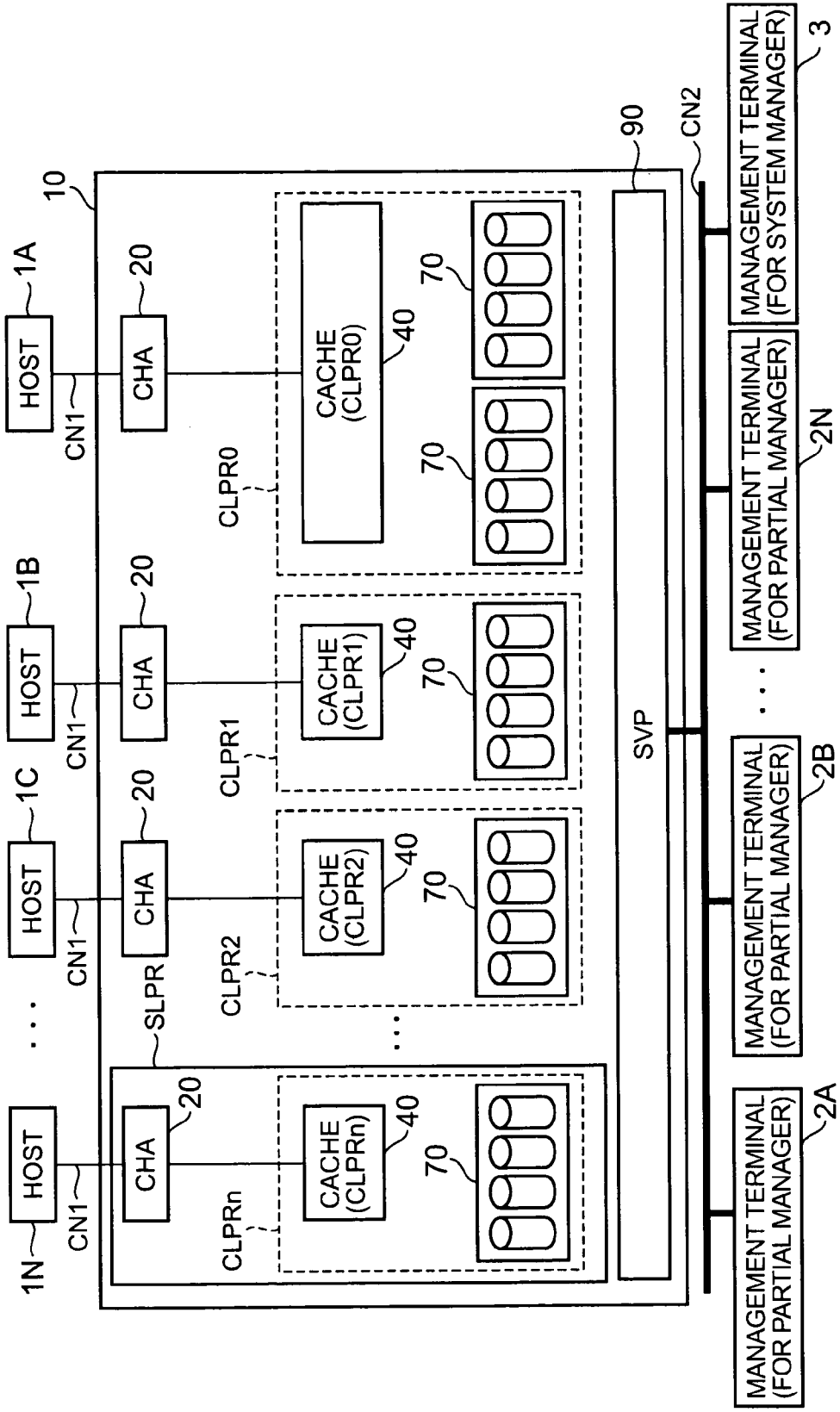
FIG. 2 is a block diagram showing the general logical configuration of the storage system.

FIG. 2 is a block diagram showing a general overview of a storage system 10. The storage system 10 can be connected respectively, in a mutually communicable fashion, to a plurality of host computers 1A to 1C (hereinafter, called "host computer 1", when there is no need to identify a particular host computer,) via a communications network CN1.

The communications network CN1 is, for example, a LAN (Local Area Network), a SAN (Storage Area Network), the Internet, or a dedicated circuit, or the like. If a LAN is used, data transfer is conducted between the host computer 1 and the storage system 10 in accordance with TCP/IP (Transmission Control Protocol/Internet Protocol). If a SAN is used, data transfer is conducted between the host computer 1 and the storage system 10 in accordance with a fiber channel protocol. Furthermore, if the host computer 1 is a mainframe computer, then data transfer is conducted in accordance with a communications protocol, such as FICON (Fibre Connection: registered trademark), ESCON (Enterprise System Connection: registered trademark), ACONARC (Advanced Connection Architecture: registered trademark), FIBARC (Fibre Connection Architecture: registered trademark), or the like.

Each host computer 1 is, for example, a server, personal computer, workstation, main frame computer, or the like. For example, each host computer 1 is connected to a plurality of client terminals located outside the range of the diagram, by means of a separate communications network. Each host computer 1 provides services to the respective client terminals, by, for example, reading or writing data from or to the storage system 10, in response to requests from the respective client terminals.

In the diagram, only one is depicted, but it is possible to set a plurality of virtual frame (SLPR: Storage Logical Partitions) inside the storage system 10. An "SLPR" is a region configured by assigning the respective types of physical resources and logical resources inside the storage system 10, to each respective user (or to each respective application program). In other words, for example, for each SLPR, there are respectively provided a dedicated channel adapter 20, a dedicated cache region 40, and a dedicated logical device (VDEV) 70, and the like. In other words, the SLPR behaves as if it were a virtual, small-scale storage system.

At least one or more cache partition region (CLPR: Cache Logical Partition) may be provided in an SLPR. In FIG. 2, only one SLPR is depicted on the left-hand side, but it is possible to provide a plurality of SLPRs. Furthermore, one or a plurality of CLPRs may be established in each SLPR.

A CLPR is obtained by dividing the cache memory 40 into a plurality of logical regions. A CLPR may be set respectively for each channel adapter 20. For example, if n channel adapters 20 are installed, then it is possible to provide n CLPRs. For instance, it is possible to set n to n=32, but the present invention is not limited to this. Each of the CLPR0 to CLPRn may be used respectively in a mutually independent fashion, and each host computer 1 is able to use only the CLPR that it is permitted to use, in an exclusive fashion. The operation of the host computer 1 with respect to a particular CLPR is constructed in such a manner that it does not affect any other CLPRs, as far as possible. More specifically, a configuration is adopted whereby, even if there is a concentration of access operations from a particular host computer 1, only the cache volume required by the CLPR usable by the host computer 1 is reserved, in such a manner that the resources (cache region) of the other CLPRs are not infringed upon.

The CLPR0 shown on the right-hand side in the diagram is a shared region for which an SLPR is not defined, and various information used by the whole storage system 10 is stored in this shared region CLPR0.

In the example shown in FIG. 2, the host computer 1A is only able to access the shared region CLPR0 and to input and output data to and from same. The host computer 1B, the host computer 1C and the host computer 1N are respectively able to access only the CLPR1, CLPR2 and CLPRn, and are not able to use or refer to any other CLPRs, or the like.

The SVP (Service Processor) 90 is a computer device for performing management and surveillance of the storage system 10, and it provides a server function for management purposes. The SVP 90 gathers various types of environmental information, performance information, and the like, from the respective channel adapters 20, and the respective disk adapters 30, or the like, via an internal network CN3 (see FIG. 3) such as a LAN, or the like, provided inside the storage system 10. The information gathered by the SVP 90 is, for example, information relating to the device configuration, a power supply alarm, a temperature alarm, the input/output speed (IOPS), and the like. The SVP 90 and the respective management terminals 2A-2N, 3 are, for example, connected by means of a communications network CN2, such as a LAN, or the like. By logging in to the SVP 90 by means of a management terminal, an administrator is able to carry out processing, within the range for which administrative rights have been established, in order, for example, to set up a RAID configuration, seal off various types of packages (channel adapter packages, disk adapter packages, memory packages, disk drives, or the like), change various settings, or the like.

A plurality of management terminals 2A to 2N, 3 may be connected to the SVP 90. Here, each management terminal 2A to 2N is a terminal provided for a respective SLPR, and the management terminal 3 is a terminal provided for managing the storage system 10 as a whole. In the following description, an example is taken in which one CLPR is provided for each SLPR. Therefore, the management terminals 2A to 2N are subsidiary terminals which are operated respectively by the administrators who are respectively managing each of the CLPRs. The management terminal 3 is a general terminal which is controlled by a system administrator who manages the whole storage system 10 (this person may also be called the general administrator).

The administrators of the respective subsidiary terminals 2A to 2N are able to change the settings, and the like, only in the CLPR for which they themselves have administrative rights, and they are not permitted to refer to, or change, the configuration, or other aspects, of the other CLPRs. The system administrator, on the other hand, is able to change the settings, and the like, in the whole of the storage system 10, including each one of the CLPRs.

By logging in to the SVP 90 via the general terminal 3 and dividing up the physical resources and the logical resources of the storage system 10, in an appropriate fashion, the system administrator is able to set up the SLPR (CLPR) for each user. Furthermore, the system administrator is also able to issue a user ID, or the like, to the administrators of the respective CLPRs. The administrators of the respective CLPRs log in to the SVP 90 by using the special user ID that has been issued by the system administrator. The manager of each CLPR is able to change the settings in the CLPR that he or she is managing, by operating the subsidiary terminal 2.

Figure 3:
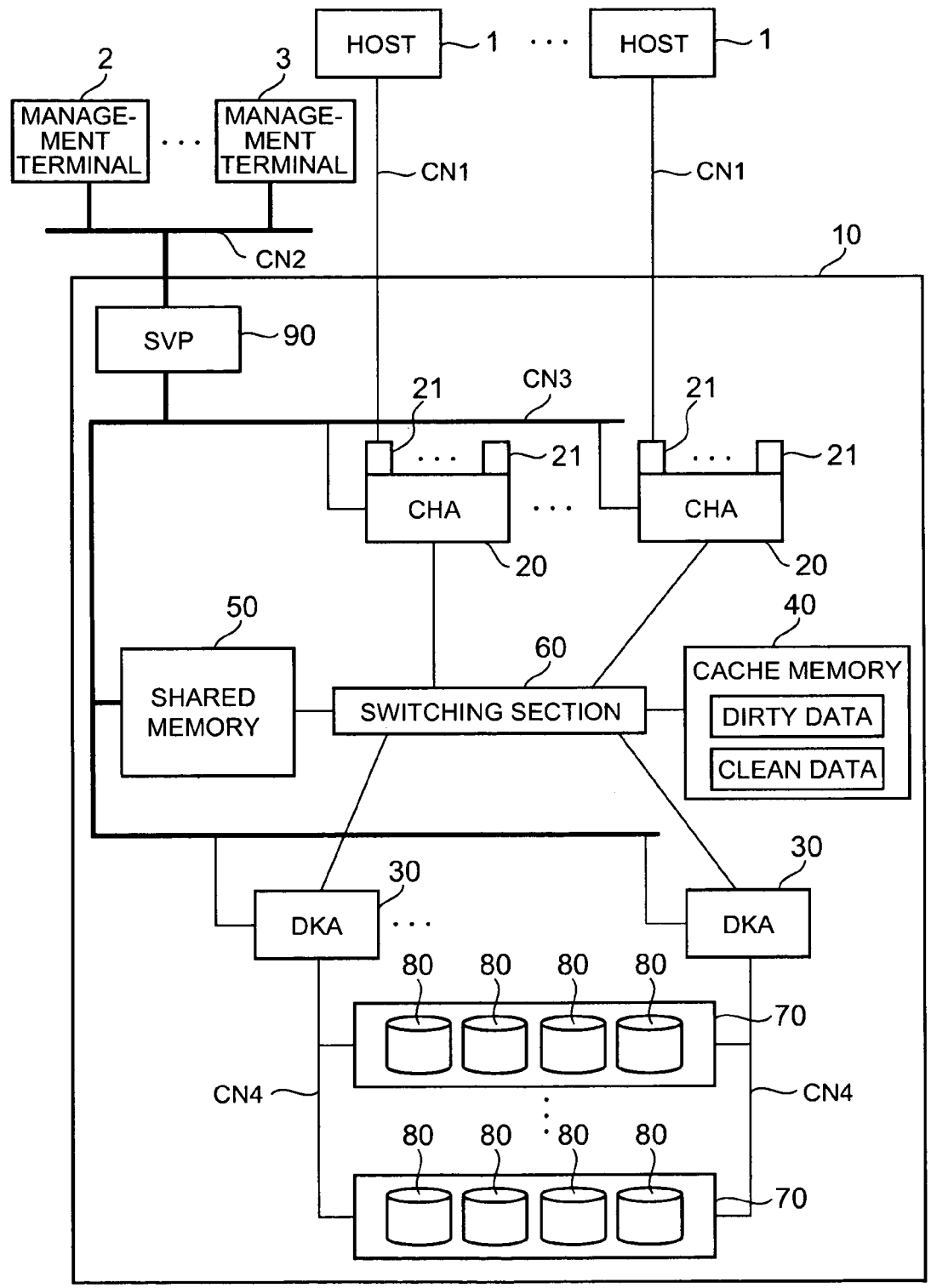
FIG. 3 is a more detailed block diagram of the storage system.

FIG. 3 is a block diagram focussing on the logical configuration of the storage system 10. The storage system 10 comprises a plurality of channel adapters (hereinafter, CHA) 20, a plurality of disk adapters (hereinafter, DKA) 30, at least one or more cache memory 40 and shared memory 50, a switch section 60, a plurality of virtual logical devices (VDEV) 70, a plurality of disk drives 80, and an SVP 90.

Each CHA 20 controls the data transfer with a respective host computer 1, and is provided with a communications port 21. The storage system 10 may be provided with 32 CHAs 20, for example. The CHAs 20 are prepared in accordance with the type of host computer 1, for example, they may be open type CHAs, main frame type CHAs, or the like.

Each CHA 20 receives data, and commands relating to reading or writing of data, from the host computer 1 to which it is respectively connected, and it operates in accordance with the commands received from the host computer 1. To describe the operation of the CHA 20 and that of the DKA 30, in advance, when the CHA 20 receives a data read out request from the host computer 1, it stores a read out command in the shared memory 50. The DKA 30 refers occasionally to the shared memory 50, and if it discovers an unprocessed read command, then it reads out dat from the disk drive 80, and stores that data in the cache memory 40. The CHA 20 reads out the data transferred to the cache memory 40, and transmits this data to the host computer 1 which issued the original command.

When the CHA 20 receives a data write request from the host computer 1, it stores the write command in a shared memory 50. Furthermore, the CHA 20 stores the receives data (user data) in the cache memory 40. Here, the data for which writing is requested by the host computer 1 is "dirty" data which has not yet been written to a disk drive 80, and therefore, it is stored in a multiple fashion, in a plurality of locations, for example.

Once the data has been stored in the cache memory 40, the CHA 20 reports completion of writing, to the host computer 1. Thereupon, in accordance with the write command stored in the shared memory 50, the DKA 30 reads out the data stored in the cache memory 40, and causes this data to be stored in a prescribed disk drive 80. The data written to the disk drive 80 changes status from "dirty" data to "clean" data, and is released from the multiple-layer management involving the cache memory 40. In the present specification, "dirty" data means data that is in a state where it has not yet been written to a disk drive 80. Moreover, "clean" data means data that has been written to a disk drive 80.

Each of the DKAs 30 may be provided in a plural fashion, for instance, comprising 4 or 8 adapters, in the storage system 10. Each DKA 30 controls data communications with a respective disk drive 80. The respective DKAs 30 and the respective disk drives 80 are connected by means of a communications network CN4, such as a SAN, for example, and data transfer is carried out in block units, in accordance with the fibre channel protocol. Each DKA 30 monitors the status of the disk drive 80 occasionally, and sends the monitoring result to the SVP 90, via the internal network CN3. The respective CHAs 20 and the respective DKAs 30 each comprise, for example, printed circuit board installed with a processor, memory, or the like, and a control program stored in the memory (none of these elements being illustrated in the diagrams), in such a manner that they respectively achieve prescribed functions by means of combined operation of these hardware and software elements.

The cache memory 40 is used to store user data, and the like, for example. The cache memory 40 is configured by a non-volatile memory, for example. The cache memory 40 can be configured by a plurality of memories, and is able to manage "dirty" data in a multi-layered fashion. In the present embodiment, the respective CLPRs 0 to n are established by dividing the whole cache region provided by the cache memory 40, into a plurality of regions.

The shared memory (or the control memory) 50 is configured by a non-volatile memory, for example. Control information, management information, and the like, is stored in the shared memory 50, for example. Information, such as control information of this kind, can be managed in a multi-layered fashion by means of a plurality of shared memories 50. A plurality of the shared memories 50 and cache memories 40 can be provided, and it is possible to mix and mount the cache memory 40 and shared memory 50. Alternatively, a portion of the memory can be provided as a cache region, and the remaining portion thereof can be used as a control region.

In the present embodiment, the management information for managing the cache data is stored in the shared memory 50. The management information is managed by means of either a hierarchical directory or a hash directory, as described hereinafter. In the storage system according to the present embodiment, it is possible to manage the management information by combined use of a hierarchical directory method and a hash directory method. In the present embodiment, as described above, the cache region is divided into a respective plurality of CLPRs, but this is not an indispensable element of the present invention and there is no necessity for the cache region to be divided up. However, by setting the CLPRs and the SLPRs, depending on circumstances, it is possible to establish a cache management method (the general terms for the hierarchical directory method or hash directory method), for each of the CLPRs, or for each of the SLPRs, individually.

The switch section 60 is connected respectively to each of the CHAs 20, each of the DKAs 30, the cache memory 40, and the shared memory 50. In this way, all of the CHAs 20 and the DKAs 30 can respectively access the cache memory 40 and the shared memory 50. The switch section 60 can be configured by an ultra-high-speed cross-bar switch, or the like, for example.

The storage system 10 may be installed with a plurality of disk drives 80. Each disk drive 80 may be configured by a hard disk drive (HDD), or a semiconductor memory device, or the like, for example.

The disk drive 80 is a physical storage device (PDEV). Furthermore, although the situation varies depending on the RAID configuration, and the like, for example, a virtual logical device (VDEV) 70 is configured on the physical storage region provided one group of four disk drives 80, for example. A virtual logical device (LU: Logical Unit) can also be established on a VDEV 70.

The storage resources used by the storage system 10 need not be provided entirely within the storage system 10, and storage resources that are situated outside the storage system 10 may also be used. For example, as described in the embodiment below, if a storage device belonging to an external storage system created by another company is assigned to a particular VDEV, and if the access path, and the like, to that storage device created by another company is managed, then it is possible to make the host computer 1 view that external storage device exactly as if it were a storage device of its own.

Figure 4:
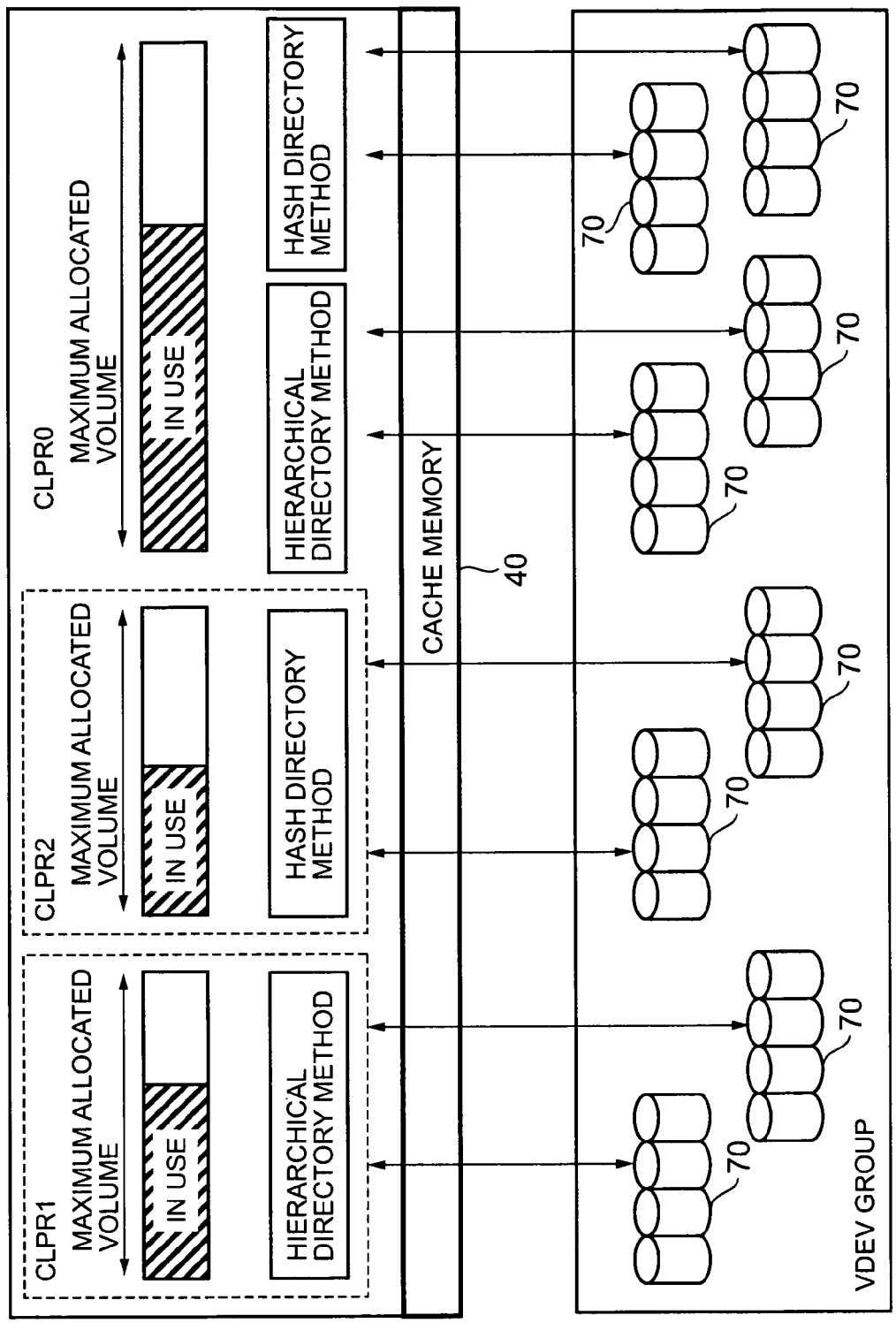
FIG. 4 is an illustrative diagram showing the relationship between the cache management method and the VDEVs.

FIG. 4 is an illustrative diagram showing a schematic view of a method for managing the cache memory. This diagram shows a case where the cache memory 40 is divided up into a shared region CLPR0, and two special CLPRs 1, 2. A cache region is assigned respectively to each CLPR.

The maximum value of the cache region that can be used by each respective CLPR (the maximum allocated volume) is set by the system administrator. The cache region allocated to each respective CLPR stores data (write data, read data) that is used by the host computer 1 that uses that particular CLPR. In FIG. 4, the region in which data is stored is marked by oblique shading, and is indicated by the annotation "in use". Each CLPR is respectively able to use a cache region up to the maximum allocated volume that it is permitted to use, and it is not able to use the cache region of another CLPR.

The data cached in the cache memory 40 is managed by the management information described hereinafter. In the present embodiment, it is possible to combine the use of two different types of management method, a hierarchical directory method and a hash directory method. In the example shown in FIG. 4, the cache management method is established respectively in units of the VDEVs 70. The data stored in particular VDEVs 70 is managed by a hierarchical directory method, and the data stored in the other VDEVs 70 is managed by a hash directory method.

As shown in FIG. 4, at least one or more VDEV 70 is allocated respectively to each CLPR. Data written to the cache region of each CLPR is written to a prescribed region of the VDEV 70 to which it is respectively allocated. Moreover, data read out from a VDEV 70 is held in the cache region of the corresponding CLPR. The data stored in each VDEV 70 is managed by either a hierarchical directory method or a hash directory method.

Figure 5:
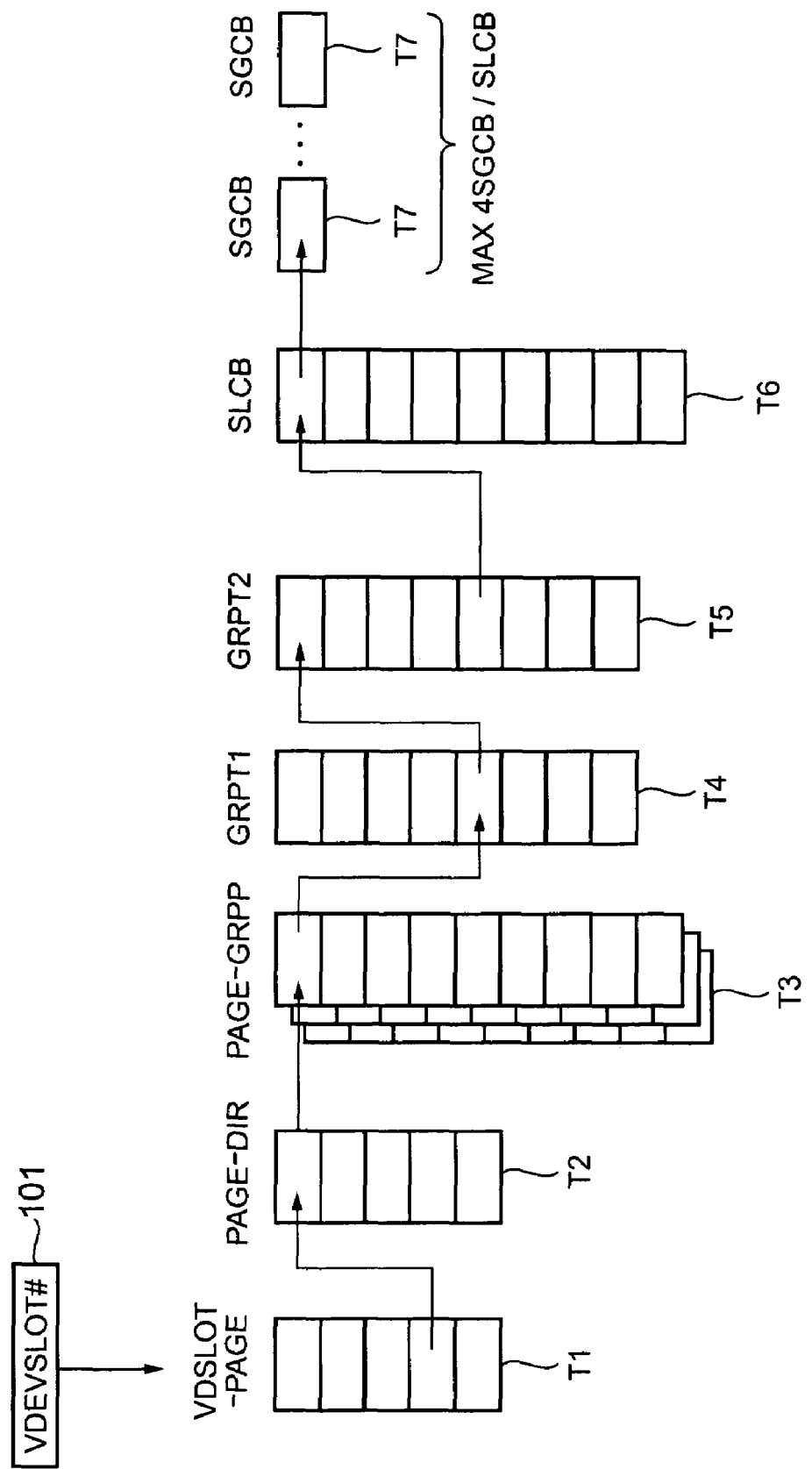
FIG. 5 is an illustrative diagram showing a schematic view of the management of cache data by means of a hierarchical directory method.

FIG. 5 is an illustrative diagram showing an overview of a method for managing cache data by means of a hierarchical directory method.

Firstly, when there is a data input or output request from a host computer 1, a VDEVSLOT number (VDEVSLOT #) is determined, on the basis of the LBA (Logical Block Address) contained in that input/output request. Thereupon, by referring to the VDSLOT-PAGE table T1 on the basis of this VDEVSLOT number, a pointer to the next level is acquired. The VDSLOT-PAGE table T1 contains a point to the PAGE-DIR table T2. The PAGE-DIR table T2 contains a point to the PAGE-GRPP table T3. And furthermore, the PAGE-GRPP table T3 contains a pointer to the GRPT1 table T4. The GRPT1 table T4 contains a pointer to the GRPT2 table T5. The GRPT2 table T5 contains a pointer to the SLCB (slot control table) T6.

In this way, by referring sequentially to the respective tables T1 to T5, on the basis of the unique VDEVSLOT number determined from the LBA, the process arrives at the SLCB table T6 which manages the desired data. The SLCB table T6 is associated with at least one or more SGCB (segment control block) table T7. The SGCB table T7 stores control information relating to a segment, which is the minimum unit of cache management. One to four segments can be associated with any one slot. The minimum unit used in cache management is a segment, but there may also be cases where the cache is managed in slot units.

If a host computer 1 performs a read access operation, then the requested data is identified by following through the respective hierarchical tables T1 to T6, in succession. The data requested by the host computer 1 is read out from the disk drive 80, which is a physical device, and stored in one or a plurality of slots on the cache region.

Figure 6:
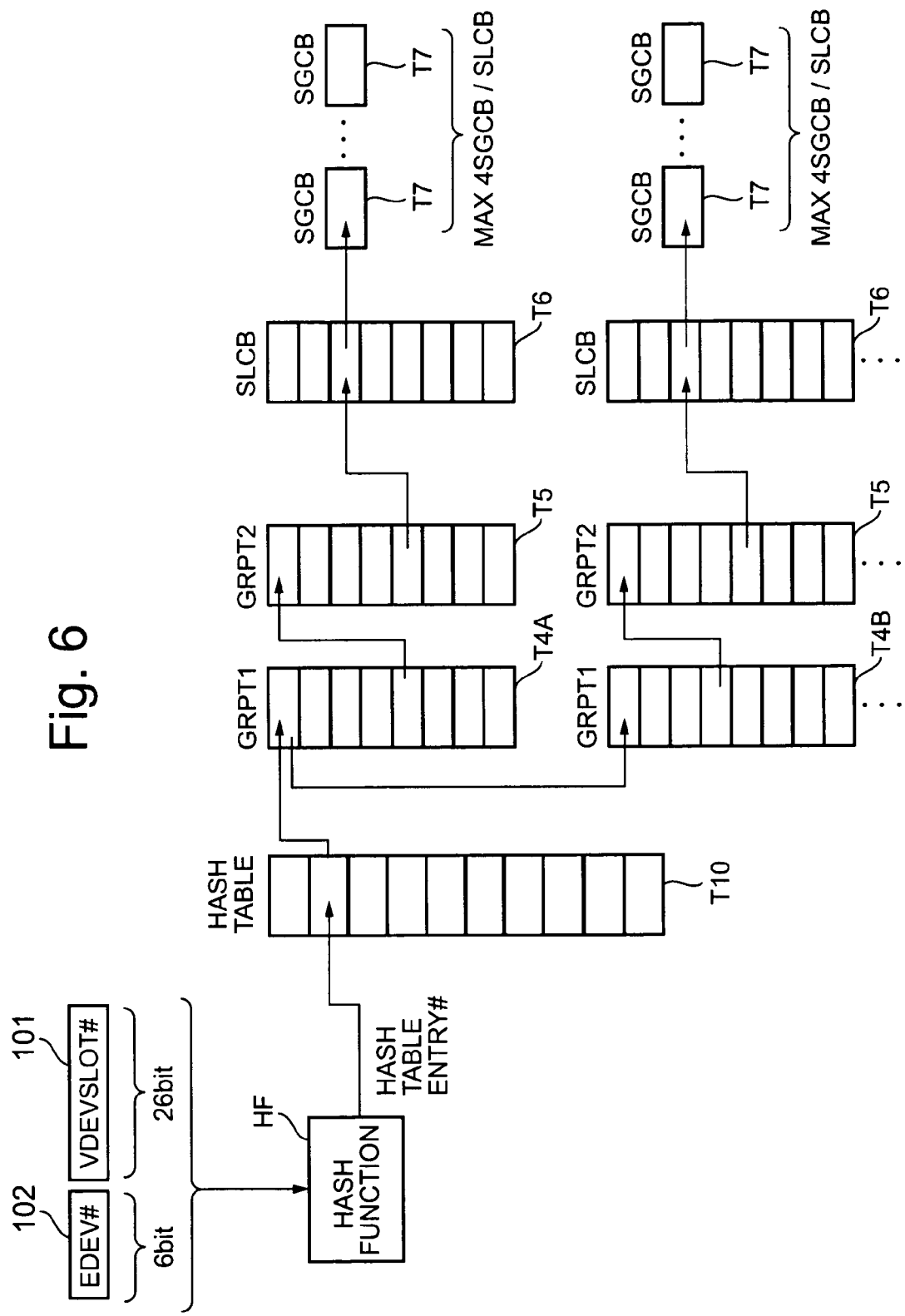
FIG. 6 is an illustrative diagram showing a schematic view of the management of cache data by means of a hash directory method.

FIG. 6 is an illustrative diagram showing an overview of a method of managing cache data by means of a hash directory method.

In the hash directory method, the VDSLOT-PAGE table T1, the PAGE-DIR table T2, and the PAGE-GRPP table T3 in the hierarchical directory method are replaced by a single hash table T10.

Figure 7:
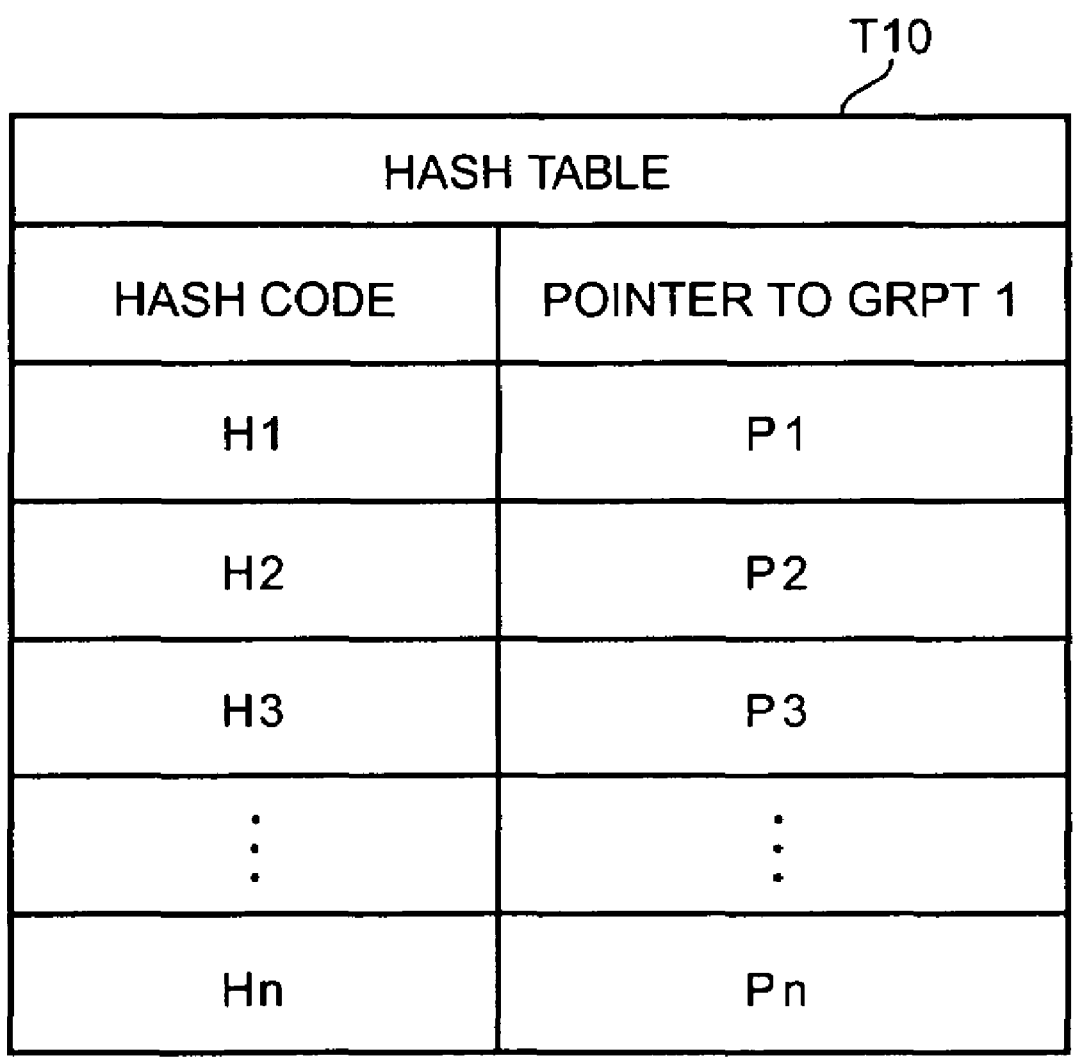
FIG. 7 is an illustrative diagram showing the general configuration of a hash table.

As shown in FIG. 7, a pointer to the GRPT1 table T4 is stored for each hash code in the hash table T10. A hash code is obtained by inputting a hash key to a hash function HF.

In the present embodiment, the VDEVSLOT number and the EDEV number, which are data elements originating in the LBA, are used as the hash key. The EDEV number is additional information used in order to expand the VDEVSLOT number. The whole of the EDEV number (for example, 6 bits) and a portion of the VDEVSLOT number (for example, the significant 26 bits) are used as hash keys. In the present embodiment, the data size of the hash keys is a fixed-length 32 bits. The hash function HF generates a hash code of fixed length, on the basis of the 32-bit hash key that is input. This hash code is a key for retrieving a pointer that has been entered in the hash table T10.

The hash key configured by the EDEV number and the VDEVSLOT number originates from the LBA and contains information that is distributed over a relatively large address space. Therefore, although there may be some differences depending on the design of the hash function HF, and the like, it is possible to suppress hash code conflicts (namely, the generation of the same hash code from different hash keys). In the hierarchical directory described in conjunction with FIG. 5, the VDEVSLOT number is used directly as a retrieval key, in order to retrieve the VDSLOT-PAGE table T1. However, in the hash directory shown in FIG. 6, rather than using the VDEVSLOT number directly as a hash key, a hash key is obtained by combining a prescribed number of significant bits of the VDEVSLOT number and an EDEV number attached in order to expand the storage region.

Therefore, even if a data group cached on the same cache memory 40 is managed by combined use of hierarchical directories and hash directories, it is possible to reduce situations in which there is access conflict between the different cache management methods. In other words, if the VDEVSLOT number is used directly as an initial retrieval key, in both the hierarchical directory and the hash directory, then it will be necessary to retrieve both the hierarchical directory and the hash directory in order to obtained particular desired data, and this entails a large amount of waste. By contrast, in the present embodiment, a configuration is adopted whereby the VDEVSLOT number forming the initial retrieval key is changed between the hierarchical directory and the hash directory, and therefore the possibility of access conflicts occurring can be reduced. Moreover, since both methods essentially manage the cache data by using data that originates from the LBA, then as described hereinafter, it is possible to use a shared configuration on the downstream side. If it is distinguished, from the start of the retrieval, which of the respective directories is used, then no problems will occur, even if common intermediate keys are used in the retrieval.

Figure 8:
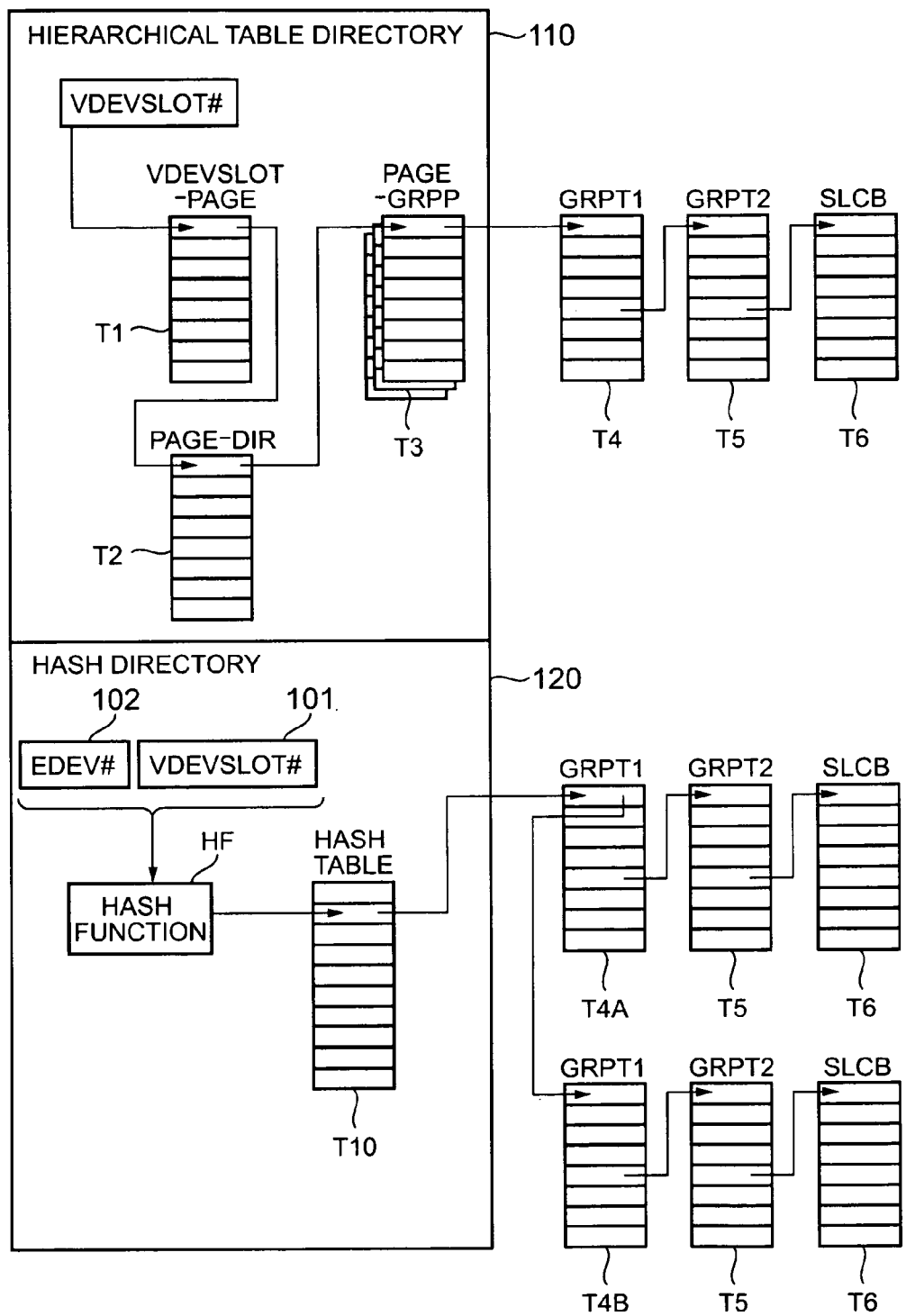
FIG. 8 is an illustrative diagram showing the management of data by combined use of a hierarchical directory method and a hash directory method.

FIG. 8 is a conceptual diagram showing the aspect of a cache management method according to the present embodiment. In this storage system 10, it is possible to use both a hierarchical directory method and a hash directory method, in combination, for managing the cache data. In other words, the storage system 10 comprises both a hierarchical table directory section 110 and a hash directory section 120, as cache managing sections. In the hash directory section 120, all of the EDEV number 102 (6 bits) and a portion of the VDEVS-LOT number 101 (the most significant 26 bits thereof), are used as a hash key.

Although the situation may change in accordance with the design of the hash function HF, and the degree of dispersion of the hash key, and the like, cases may arise in which the same hash code is generated even if different hash keys are supplied. If a hash code conflict of this kind occurs, then the same pointer (pointer to GRPT1 table) is supplied respectively for different data. In order to deal with hash code conflicts of this kind, in the hash directory method, the GRPT1 table T4 is expanded. More specifically, the unused portion of the GRPT1 table T4A is used and linking to another table GRPT1 table T4B, thereby expanding the table T4. The diagram shows a state where two tables T4A, T4B are linked, but the configuration is not limited to two tables, and the size of the GRPT1 table T4 can be expanded by linking a greater number of tables.

Since a configuration is adopted wherein a plurality of tables are linked together by storing the pointers to the link destination table in an unused portion of the GRPT1 table T4, then the size of the actual GRPT1 table T4 itself does not change, and only the overall size is increased. If the same GRPT1 table T4 is used in a hierarchical directory, then the pointer to the link destination table should not be stored in the unused portion.

Figure 9:
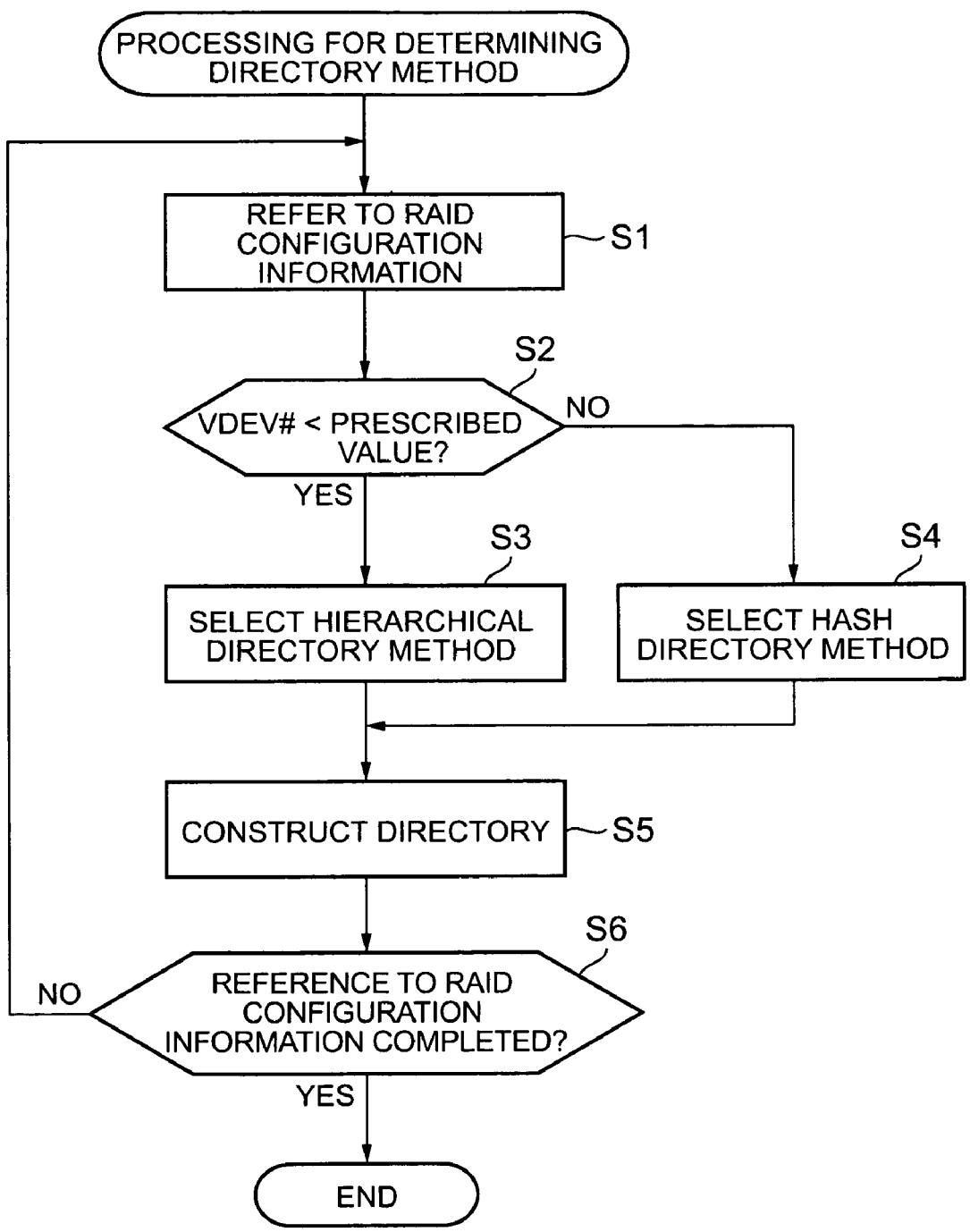
FIG. 9 is a flowchart illustrating processing for determining a directory method.

FIG. 9 is a flowchart showing directory method determination processing for determining the selective use of a hierarchical directory method or a hash directory method. The flowchart in FIG. 9 shows an overview of processing for setting up the cache management method, in VDEV units. This processing can be executed automatically, for example, when the initial settings are made in the storage system 10, or when the configuration is changed, or the like. Alternatively, it is also possible for this processing to be carried out manually, by the system administrator, via a management terminal 3.

This processing can be executed by combined operation of the processor of the CHA 20 and the processor of the DKA 30, for example. Hereinafter, these respective processors are generally termed a "representative processor".

Upon making initial settings in the storage system 10, or when a VDEV 70 has been added or moved, or the like, the representative processor refers to the RAID configuration information (S1). The RAID configuration information is information relating to the configuration of the storage system 10, and it contains information indicating, for example, which disk drive 80 the VDEV 70 is configured by, as well as the VDEV number used to identify that VDEV 70.

The representative processor acquires the VDEV number relating to the VDEV 70 for which the cache management method is to be set up, by referring to the RAID configuration information, and judges whether or not this VDEV number is lower than a previously established prescribed value (for example, 256) (S2).

If the VDEV number is less than the prescribed value (S2: YES), then the hierarchical directory method is selected (S3). More specifically, it is determined that the data stored in the VDEV 70 identified by that VDEV number is to be managed by means of a hierarchical directory method. On the other hand, if the VDEV number is equal to or greater than the prescribed value (S2: NO), then the hash directory method is selected (S4).

Thereupon, the representative processor constructs a directory for managing the data stored in the VDEV 70, on the shared memory 50, on the basis of the cache management method selected at S3 or S4 (S5). Here, constructing a directory means constructing a hierarchical directory table or a hash table for realizing the corresponding cache management method. Thereafter, a pointer, or the like, is registered in the directory constructed at S5, each time that a data read out or data writing operation occurs which relates to that VDEV 70.

A management method is determined for all of the VDEVs 70 which are subject to decision of the cache management method, and the processing in steps S1 to S5 is repeated, up to the construction of the directory in the shared memory 50 (S6).

In the present embodiment, the maximum value of the number of VDEVs which can be installed in the storage system 10 (for example, 256) is used as the prescribed value in S2. A VDEV whose VDEV number exceeds the maximum number of VDEVs is an externally added VDEV, as in a case where one company's storage system is connected to another company's storage system. Therefore, if the prescribed value is set to the maximum number of VDEVS, all of the external VDEVs having a VDEV number of 256 or more will be managed by means of a hash directory method.

In this way, according to the present embodiment, cache data can be managed by combined use of a hierarchical directory method and a hash directory method. Therefore, even if the storage capacity of the storage system 10 has increased, it is possible to prevent a decline in access performance, without significantly increasing the region used for storing management information. For example, in a storage system installed with 256 VDEVs 70, which provides a total of approximately 700 TB of storage capacity, if the whole of the storage system is managed by means of a hierarchical directory method, then a region of approximately 1.6 GB will be required as a storage region for the hierarchical directory tables. However, in the case of a hash directory method, it will be possible to store the hash tables in a storage region of about 100 MB, regardless of the storage capacity of the storage system. Therefore, if the 256 internal VDEVs 70 are managed by means of a hierarchical directory method, and the other external VDEVs besides these are managed by means of a hash directory method, then the region required for cache management will be the sum of the storage region of approximately 1.6 GB required for the hierarchical directory tables and the storage region of approximately 100 MB required for the hash tables, making a total of approximately 1.7 GB. Even if the number of VDEVs is increased, the region of the has tables will not change, and therefore it is possible to respond to increased capacity of the storage system, without leading to increase in the management region, and without causing access performance to decline.

In the present embodiment, a configuration was adopted wherein a portion of the VDEVSLOT number which originates from the LBA is used as a hash key for generating a hash code. Therefore, access conflicts between the hierarchical directory method and the hash directory method can be suppressed, and common operation of both methods can be achieved. Moreover, by using a portion of the EDEV number and the VDEVSLOT number as a hash key, it is also possible to suppress conflicts between has codes.

In the present embodiment, as shown in FIG. 8, even if the data is managed by means of a hash directory, then a configuration can be adopted wherein the downstream side of the retrieval path uses the same directory structure as in the prior art. Therefore, a common downstream side structure can be used for both the hierarchical directory and the hash directory, and hence the overall configuration can be simplified. Furthermore, it is also possible readily to change the cache management method between a hierarchical directory method and a hash directory method.

In the present embodiment, it is possible to select the cache management method for each VDEV. Therefore, the cache management method can be set in VDEV units, this being the smallest unit of the logical storage devices, and it is also possible to respond readily to changes in the RAID configuration, the CLPR configuration, or the like.

2. Second Embodiment

A second embodiment is described with reference to FIG. 10 and FIG. 11. This second embodiment is equivalent to a modification of the first embodiment, the characteristic feature thereof lying in the fact that the cache management method is selected on the basis of a previously established directory method management table T11.

FIG. 10 is an illustrative diagram showing a general view of a directory method management table T11. It is previously set in this directory method management table T1, for each VDEV number, whether that VDEV is to be managed by means of a hierarchical directory method or by means of a hash directory method.

Figure 11:
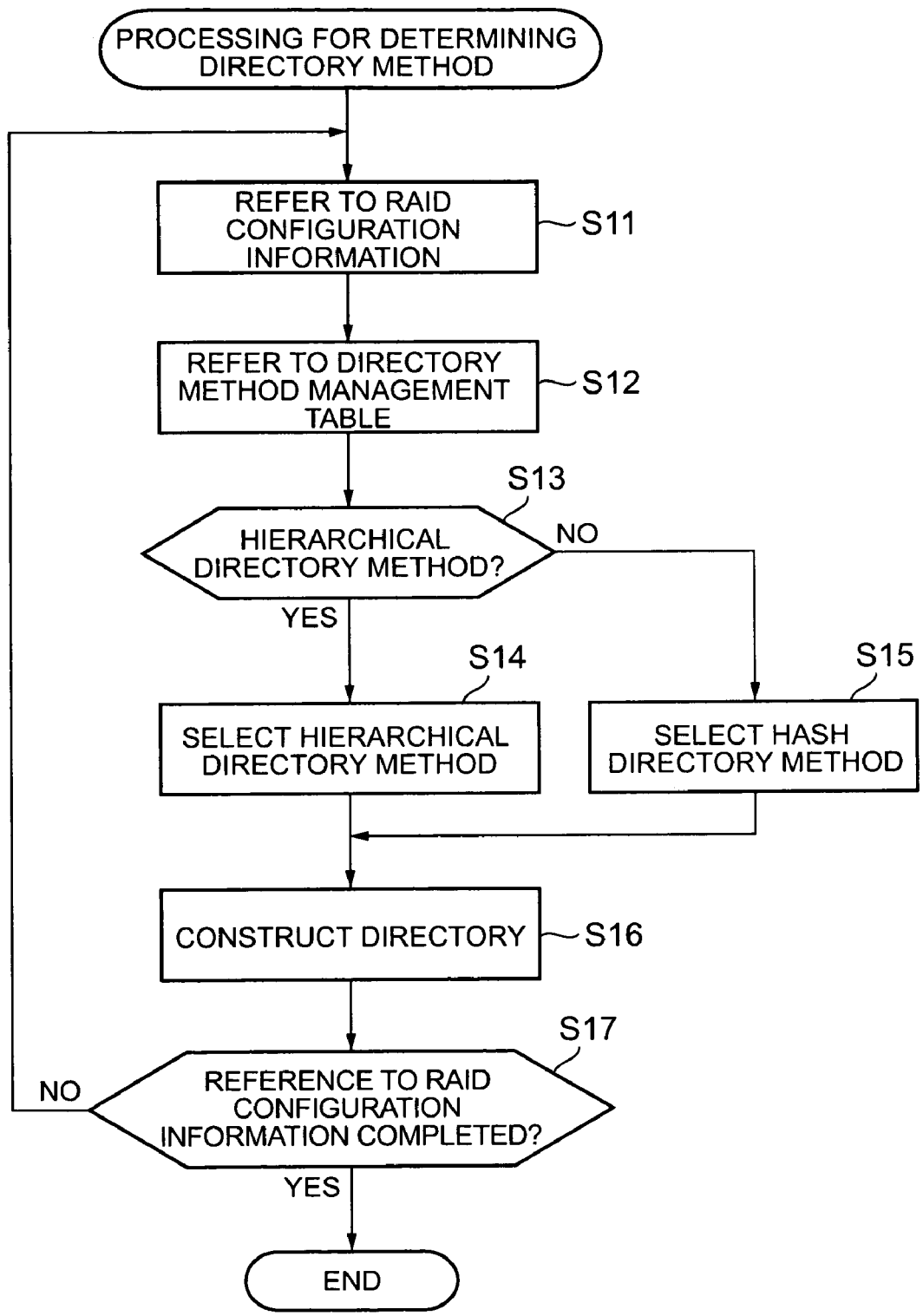
FIG. 11 is a flowchart illustrating processing for determining a directory method.

An overview of the directory method determining processing T11 is described on the basis of FIG. 11. The representative processor acquires a VDEV number by referring to the RAID configuration information (S11). The representative processor refers to the directory method management table T11, using the VDEV number as a retrieval key, and reads out the cache management method associated with that VDEV number (S12).

If the cache management method associated with that VDEV number is a hierarchical directory method (S13: YES), then the representative processor selects a hierarchical directory method (S14), and constructs a hierarchical directory in the shared memory 50 (S16). If the cache management method established for that VDEV number is a hash directory method (S13: NO), then the representative processor selects a hash directory method (S15) and constructs a hash directory in the shared memory 50 (S16).

The processing in S11 to S16 is repeated until a directory has been constructed for all of the VDEV 70 for which a directory is to be constructed (S17).

3. Third Embodiment

A third embodiment is now described on the basis of FIG. 12 and FIG. 13. The third embodiment is equivalent to a modification of the first embodiment, and it comprises a plurality of modifications.

As shown in the management table T11A in FIG. 12(a), it is possible to adopt a configuration whereby the cache management method can be selected respectively for each LU.

Moreover, as shown in the management table T11B in FIG. 12(b), it is also possible to adopt a configuration whereby the cache management method can be selected respectively for each port 21. Furthermore, as shown in the management table T11C in FIG. 13, it is also possible to adopt a configuration whereby the cache management method can be selected respectively for each EDEV number.

Alternatively, it is also possible to combine, suitably, the setting of the cache management method in LU units, port units, and EDEV units.

4. Fourth Embodiment

Figure 14:
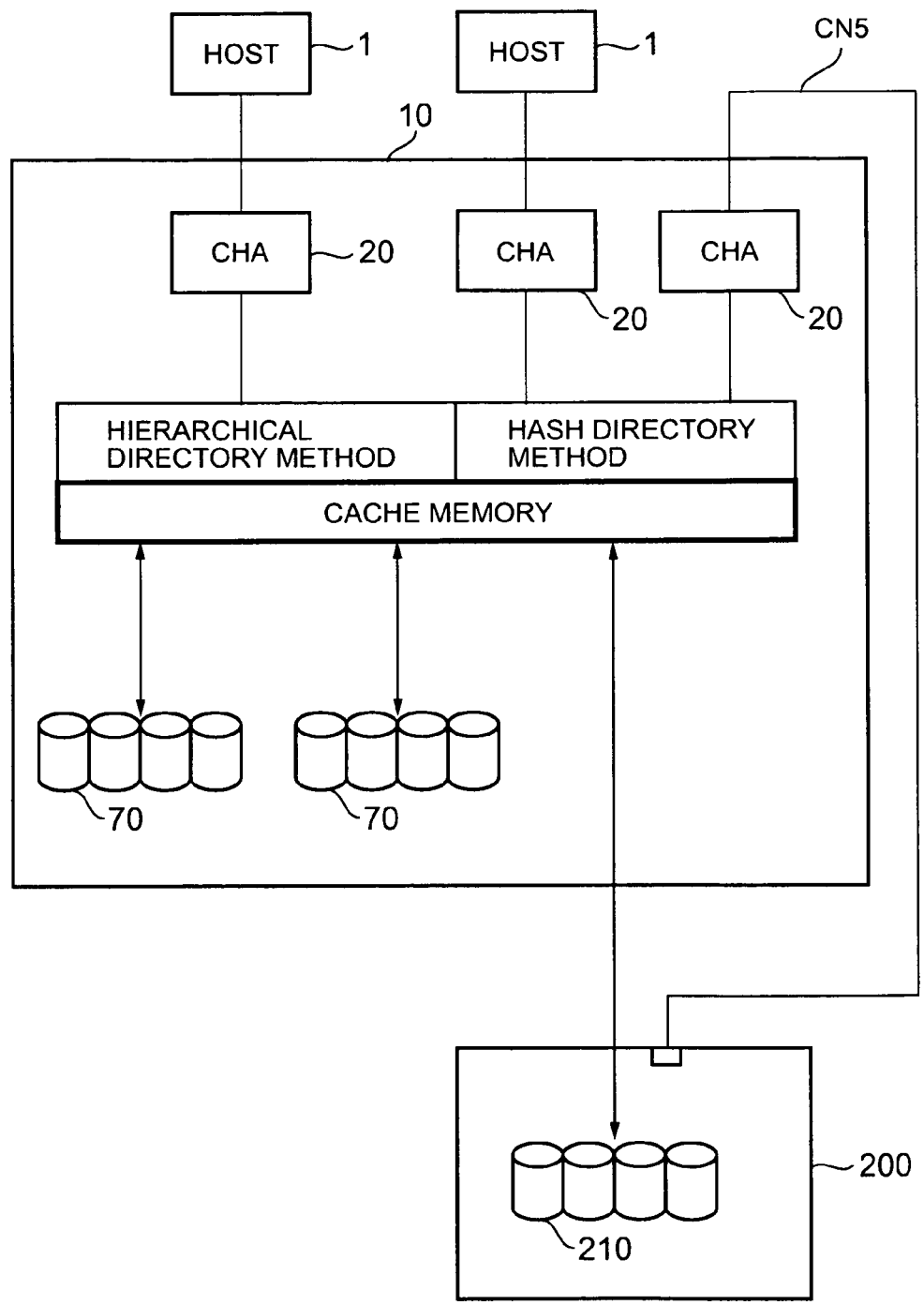
FIG. 14 is a compositional conceptual view relating to a fourth embodiment.

A fourth embodiment is now described on the basis of the conceptual configuration view in FIG. 14. The characteristic feature of this fourth embodiment lies in the fact that a suitable cache management method is selected in cases where the storage resources of another company's external storage system 200 are used as storage resources of the storage system 10.

The storage system 10 and the external storage system 200 are connected by means of a CHA 20 and a communications network CN5. The storage system 200 comprises a LU 210, which is a logical storage region. This LU 210 is mapped as a VDEV 70 of the storage system 10, and from the perspective of a host computer 1, there is no distinction between a LU 210 and a VDEV 70. In other words, the storage system 10 causes the host computer 1 to regard an external LU 210 exactly as if it were a VDEV within the storage system 10.

In this embodiment, the VDEVs 70 inside the storage system 10 are managed by means of a hierarchical directory method, and the LU 210 that is external to the storage system 10 is managed by means of a hash directory method. By managing an LU 210 which has an unknown storage capacity, by means of a hash directory method, it is possible to manage the cache data even in cases where the capacity of the external storage resources connected to the storage system 10 is increased.

5. Fifth Embodiment

Figure 15:
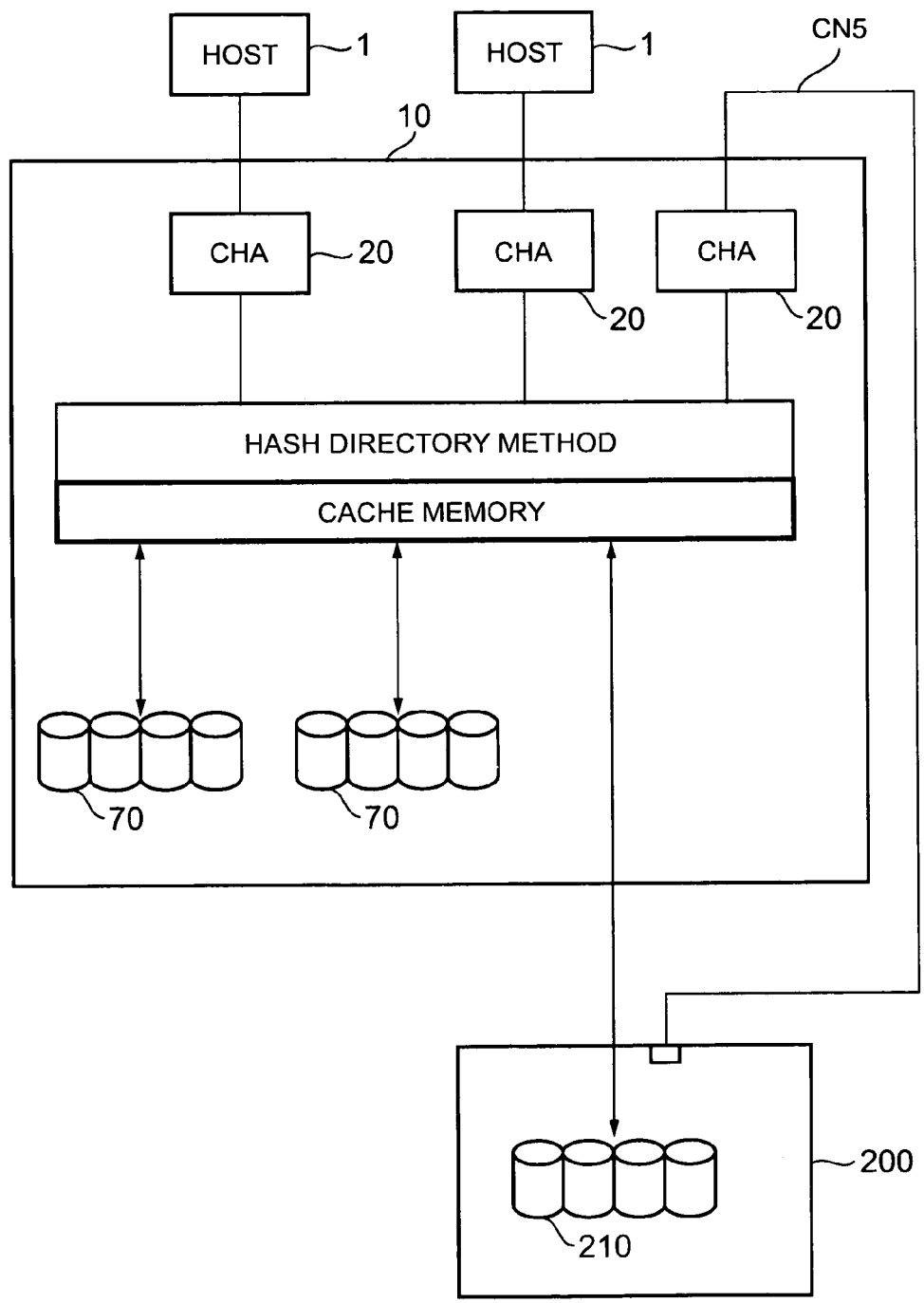
FIG. 15 is a compositional conceptual view relating to a fifth embodiment.

FIG. 15 is a conceptual configuration diagram of a fifth embodiment. The characteristic feature of the fifth embodiment lies in the fact that all of the data is managed by a hash directory method. In this case, the size of the hash table is approximately uniform, independent of the storage capacity provided by the storage system 10.

6. Sixth Embodiment

Figure 16:
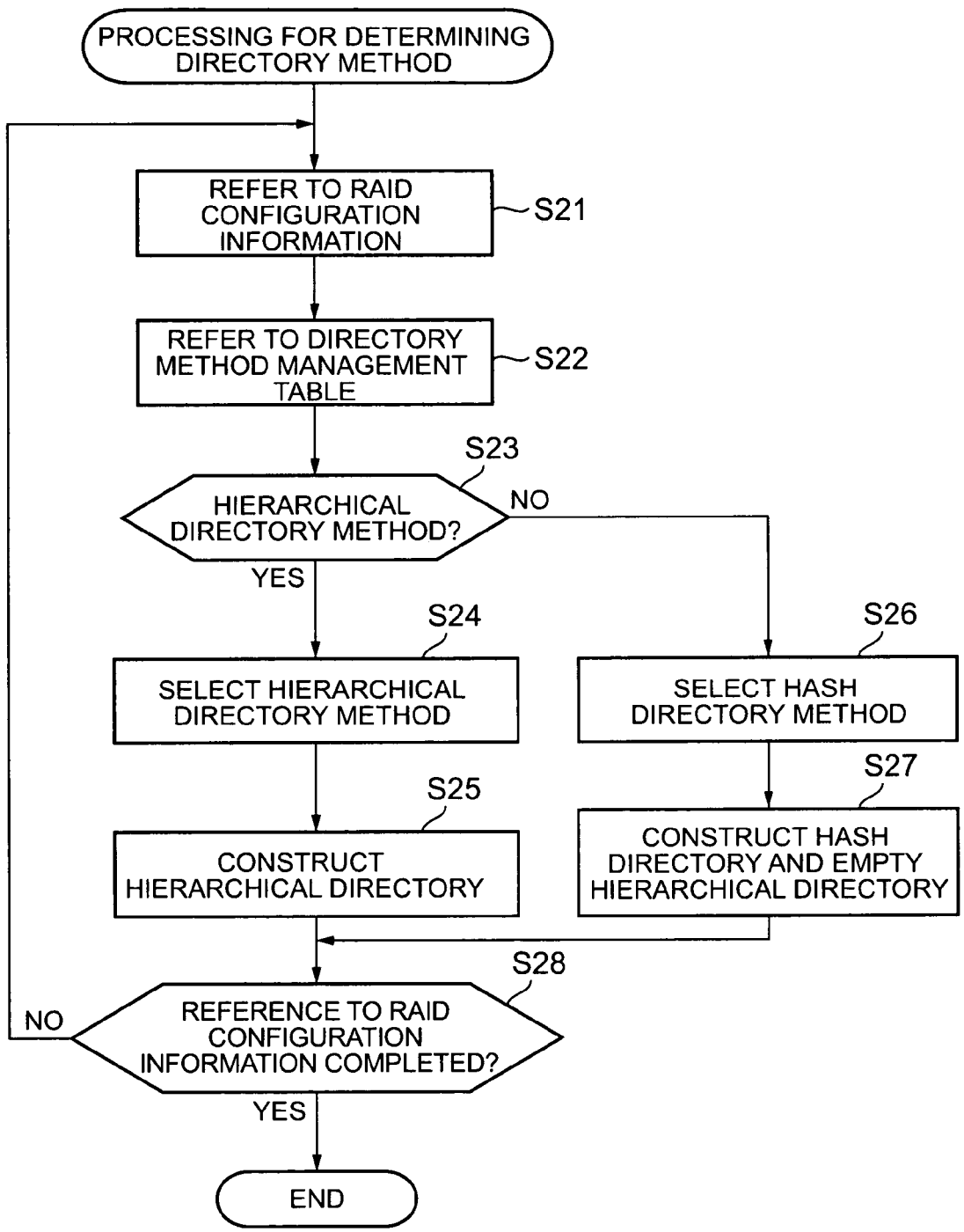
FIG. 16 is a flowchart of processing for determining a directory method relating to a sixth embodiment.

Next, FIG. 16 is a general flowchart of directory method determining processing according to a sixth embodiment. The characteristic feature of the present embodiment lies in the fact that an empty hierarchical directory is constructed, when data is being managed by means of a hash directory method.

On the basis of the RAID configuration information (S21), the representative processor refers to refers to the directory method management table T11 (S22), and determines whether or not a hierarchical directory method has been established for the VDEV 70 in question (S23).

If the hierarchical directory method has been set (S23: YES), then the representative processor selects the hierarchical directory method (S24), and constructs a hierarchical directory for managing that VDEV 70, in the shared memory 50 (S25).

If a hash directory method has been set for that VDEV 70 (S23: NO), then the representative processor selects the hash directory method (S26), and constructs a hash directory and a hierarchical directory, respectively, in the shared memory 50 (S27). However, the content of the hierarchical directory table forming this hierarchical directory is empty, and it is not actually used.

Thereby, initially, data is managed by means of a hash directory method, and if the method is subsequently changed to a hierarchical directory method, then this change can be carried out relatively easily.

The present invention is not limited to the embodiments described above. A person skilled in the art would be able to make various additions and/or modifications, or the like, without departing from the scope of the present invention. For example, the cache management method may be implemented universally when the initial settings of the storage system are made, or it may also be implemented when the configuration of the storage system is changed, for example. Moreover, the management method may also be changed between a hierarchical directory method and a hash directory method.

What is claimed is:

1. A storage system, comprising:
   a plurality of channel adapters for respectively controlling transmission and reception of data to and from a host device;
   a plurality of storage device groups for respectively providing logical storage regions;
   a plurality of disk adapters for respectively controlling transmission and reception of data to and from each of said storage device groups;
   a cache memory used respectively by each of said channel adapters and each of said disk adapters;
   a control memory for storing management information groups for managing said cache memory; and
   a cache managing unit for managing data to be stored in said cache memory by using said management information groups stored in said control memory;
   wherein said cache managing unit comprising a hierarchical directory section and a hash directory section, which operate in parallel with each other;
   said hierarchical directory section manages data in said cache memory and corresponding to said storage system, using a first portion of said management information groups; and
   said hash directory section manages data in said cache memory and corresponding to another storage system external to said storage system, using a second portion of said management information groups other than said first portion.

2. The storage system according to claim 1, wherein data originating from a logical block address is used as a hash key for generating a hash code used in said hash directory section.

3. The storage system according to claim 2, wherein a downstream side of the retrieval path of said hash directory section, and a downstream side of the retrieval path of said hierarchical directory section, constitute a common structure.

4. The storage system according to claim 2, wherein said hierarchical directory section is previously prepared with an empty structure for said management information groups which are managed by said hash directory section.

5. The storage system according to claim 2, wherein a configuration is adopted whereby the data originating from said logical block address is a slot number determined in a unique fashion from said logical block address, in such a manner that the slot number used in said hierarchical directory section is different from the slot number used in said hash directory section.

6. The storage system according to claim 1, wherein said first and second portions of said management information groups are managed respectively by said hierarchical directory section and said hash directory section, but not by both of said hierarchical directory section and said hash directory section, for each of said storage system and said external storage system, respectively.

7. The storage system according to claim 1, wherein at least one prescribed storage device of said storage device groups is mapped to a logical storage region in said external storage system.

8. A storage system, comprising:
   a plurality of channel adapters for respectively controlling transmission and reception of data to and from a host device;
   a plurality of storage device groups for respectively providing logical storage regions;
   a plurality of disk adapters for respectively controlling transmission and reception of data to and from each of said storage device groups;
   a cache memory used respectively by each of said channel adapters and each of said disk adapters;
   a control memory for storing management information groups for managing said cache memory;
   a hierarchical directory constructed in said control memory, for managing data in said cache memory corresponding to said storage system, using a first portion of said management information groups; and
   a hash directory, constructed in said control memory, for managing data in said cache memory corresponding to another storage system external to said storage system, using a second portion of said management groups other than said first portion;
   wherein a downstream side of said hash directory is formed by a hierarchical directory of the same structure as said hierarchical directory constructed in said control memory; and
   wherein data determined in a unique fashion from a logical block address is used as a hash key for generating a hash code used in said hash directory.

9. The storage system according to claim 8, wherein said hierarchical directory is previously prepared with an empty structure for said management information groups which are managed by said hash directory.

10. The storage system according to claim 8, wherein a configuration is adopted whereby the data originating from said logical block address is a slot number determined in a unique fashion from said logical block address, in such a manner that the slot number used in said hierarchical directory is different from the slot number used in said hash directory.

11. The storage system according to claim 8, wherein said first and second portions of said management information groups are managed respectively by said hierarchical directory and said hash directory, but not by both of said hierarchical directory and said hash directory, for each of said storage system and said external storage system, respectively.

12. The storage system according to claim 8, wherein at least one prescribed storage device of said storage device groups is mapped to a logical storage region of the external storage system.

* * * * *